United States Patent
Kawatani

(10) Patent No.: US 7,308,138 B2
(45) Date of Patent: Dec. 11, 2007

(54) DOCUMENT SEGMENTATION METHOD

(75) Inventor: Takahiko Kawatani, Kanagawa (JP)

(73) Assignee: Hewlett-Packard Development Company, L.P., Houston, TX (US)

( * ) Notice: Subject to any disclaimer, the term of this patent is extended or adjusted under 35 U.S.C. 154(b) by 769 days.

(21) Appl. No.: 10/432,543

(22) PCT Filed: Nov. 16, 2001

(86) PCT No.: PCT/US01/43534

§ 371 (c)(1),
(2), (4) Date: Dec. 8, 2003

(87) PCT Pub. No.: WO02/48951

PCT Pub. Date: Jun. 20, 2002

(65) Prior Publication Data

US 2004/0086178 A1    May 6, 2004

(30) Foreign Application Priority Data

Dec. 12, 2000    (JP)    ............................. 2000-378015

(51) Int. Cl.
*G06K 9/34*    (2006.01)
(52) U.S. Cl. .................. 382/173; 382/175; 382/176
(58) Field of Classification Search ............... 382/173, 382/175, 176; 707/3, 100–102
See application file for complete search history.

(56) References Cited

U.S. PATENT DOCUMENTS

| | | | |
|---|---|---|---|
| 5,390,258 A | * | 2/1995 | Levin .......................... 382/131 |
| 5,583,956 A | | 12/1996 | Aghajan et al. |
| 5,761,685 A | | 6/1998 | Hutson |
| 5,794,178 A | | 8/1998 | Caid et al. |
| 6,775,677 B1 | * | 8/2004 | Ando et al. ................. 707/102 |
| 6,920,450 B2 | * | 7/2005 | Aono et al. ..................... 707/3 |
| 2004/0068396 A1 | * | 4/2004 | Kawatani ........................ 703/2 |
| 2004/0205457 A1 | * | 10/2004 | Bent et al. .................. 715/500 |
| 2005/0249412 A1 | * | 11/2005 | Radhakrishnan et al. ... 382/173 |

FOREIGN PATENT DOCUMENTS

EP    1462950 A1 *    3/2003

OTHER PUBLICATIONS

Berry, M.—"Matrices, Vector Spaces, and Information Retrieval"—SIAM Review—Apr. 1999, vol. 41, No. 2, pp. 335-362.*

(Continued)

*Primary Examiner*—Jingge Wu
*Assistant Examiner*—Bernard Krasnic

(57) ABSTRACT

A document segmentation method of detecting segmentation points where a topic of an input document is discontinuous before and after the point to divide the document into plural blocks includes: detecting terms that occur in an input document; segmenting the input document into document segments, each segment being an appropriate sized chunk; generating document segment vectors with as its elements values related to frequencies of the terms occurring in the document segments; calculating eigenvalues and eigenvectors of a square sum matrix of the document segment vectors; selecting the basis vectors consisting a subspace from the eigenvectors to calculate the topic continuity of the document segments; calculating vectors with as their elements the values corresponding to the projection values of the each document segment vector onto the basis vector; and determining segmentation points of the document based on the continuity of the projected vectors.

16 Claims, 2 Drawing Sheets

OTHER PUBLICATIONS

G. Salton et al. Automatic Text Structuring and Summarization. Advances in Automatic Text Summarization, The MIT Press, 1999, pp. 341-355.

Marti A. Hearst, Multi-Paragraph Segmentation of Expository Text. Proceedings of the 32nd Meeting of the Association for Computational Linguistics, Los Crices, NM, 1994.

* cited by examiner

DOCUMENT SEGMENTATION METHOD

RELATED APPLICATIONS

The present application is based on International Application Number PCT/US01/43534 filed Nov. 16, 2001, and claims priority from, Japanese Application Number 2000-378015, filed Dec. 12, 2000.

TECHNICAL FIELD

The invention relates to a document segmentation method to divide the document into plural blocks by detecting segmentation points where topics of an input document is discontinuous.

BACKGROUND OF THE INVENTION

The Hearst method is well known as one of document segmentation methods by detecting topic boundaries (the Hearst method can be seen in "Multi-paragraph segmentation of expository text" by M. A. Hearst in Proceedings of the 32nd Annual Meeting of Association for Computational Linguistics, pp. 9-16, 1994). This method first defines certain size windows before and after one of topic boundary candidate points and obtains similarity about what terms appear in each window. If the obtained similarity is high, topic relatedness between the windows is high and the candidate point cannot be a boundary point. If the obtained similarity is low, cohesion between the windows is regarded low and the candidate point can be a boundary point. More specifically, the topic boundary candidate point is moved by regular intervals from the top to the end of the document, similarity value is obtained for each point, and then the point of which the obtained similarity value is minimal can be selected as the topic boundary.

The Hearst method compares the terms occurring in the windows defined before and after the candidate point in order to detect the topic discontinuity between the windows. This method, however, has the following shortcomings. The first one is related to the window size. Since the window size is selected very arbitrarily, the distance between the topic boundaries, that is, the length of the topics tend to be longer when the selected window size is large, whereas the length of the topics tends to be shorter when the selected window size is small. Therefore, it is difficult to properly divide such documents containing many topics those of which length are different. The second shortcoming is related to the method for detecting topic similarity between the windows before and after the candidate point. A conventional method cannot obtain the similarity unless the same terms occur in both windows because it determines the similarity based on the commonality of terms between the windows. In reality, however, when one of a pair of terms that are relevant to each other in the document appears in first window and the other appears in second window, it is considered that the topic similarity exists between the windows. For example, if there is a sentence that has "Giants" and "Matsui" in an article about baseball, "Giants" and "Matsui" can be regarded as relevant terms. Therefore, if "Giants" appears in the first window and "Matsui" appears in the second window, it can be regarded that the topic similarity exists between these windows even if any other common terms are not contained in the windows. The conventional methods cannot detect such similarity because they focus on only the commonality of terms. Thus the conventional method has a problem related to accuracy of the topic similarity.

SUMMARY OF THE INVENTION

In order to solve the above-mentioned problem, a segmentation methods according to the invention comprises: detecting terms that occur in an input document; segmenting said input document into document segments, each segment being an appropriate sized chunk; generating document segment vectors with as their elements the values related to frequencies of said terms occurring in said document segments; calculating eigenvalues and eigenvectors of a square sum matrix of said document segment vectors; selecting basis vectors consisting a subspace from said eigenvectors to calculate the topic continuity of the document segments; calculating vectors whose m-th element value is the projection values of the each document segment vector onto said m-th basis vector; and determining segmentation points of said document based on the continuity of said projected vectors.

A segment vector is a vector whose elements take values determined based on frequencies of each of terms occurring in a document segment and represents a concept of the document segment. The most natural unit for segmenting a document is a sentence. The singular value decomposition process is applied to a set of document segment vectors to expand the set into eigenvalues and eigenvectors that are orthogonal each other. Since each eigenvector is represented by a combination of the terms, it represents a concept by itself. Since eigenvectors are determined inherently to the input document, the concept represented by each eigenvector can be called the eigenconcept. Each eigenvalue can be considered to represent the strength or the energy of the concept represented by the corresponding eigenvector. A projection value of a document segment vector onto an eigenvector is the component that the concept represented by the document segment vector has in the corresponding eigenconcept direction, and the squared projection value represents the energy of such component. The document segments whose concepts are similar with each other should have the similar values for the components in the direction of each eigenconcept. Thus the relatedness of each document segment to each eigenconcept is calculated based on the above-described projection values, then the continuity between each document segment is obtained in terms of the concept relatedness between them, and a point where the continuity is minimal is finally determined as a topic boundary As described above, according to the invention, the topic continuity is obtained based on the projection values of each document segment vector onto each eigenvector. Eigenvectors of a squared sum matrix has such characteristic that coefficients for the terms co-occurring in a document have the same sign and almost same values in the lower-dimensional eigenvectors. Accordingly, as long as one of a pair of terms ("Matsui" in the above example) co-occurring in a document appears in one of the concerned document segment and the other ("Giants" in the above example) appears in the other document segment, the projection values of the respective document segment vectors should have the relatedness even though both of the concerned document segments do not share any term. As the number of the pairs of such terms increases, the projection values become further close together. As a result, if eigenvectors are correctly selected or properly weighted, the similarity between the document segments can be correctly obtained and also a topic boundary can be properly determined even though the same topic does not continue long.

DETAILED DESCRIPTION OF THE PREFERRED EMBODIMENTS

Figure 1:
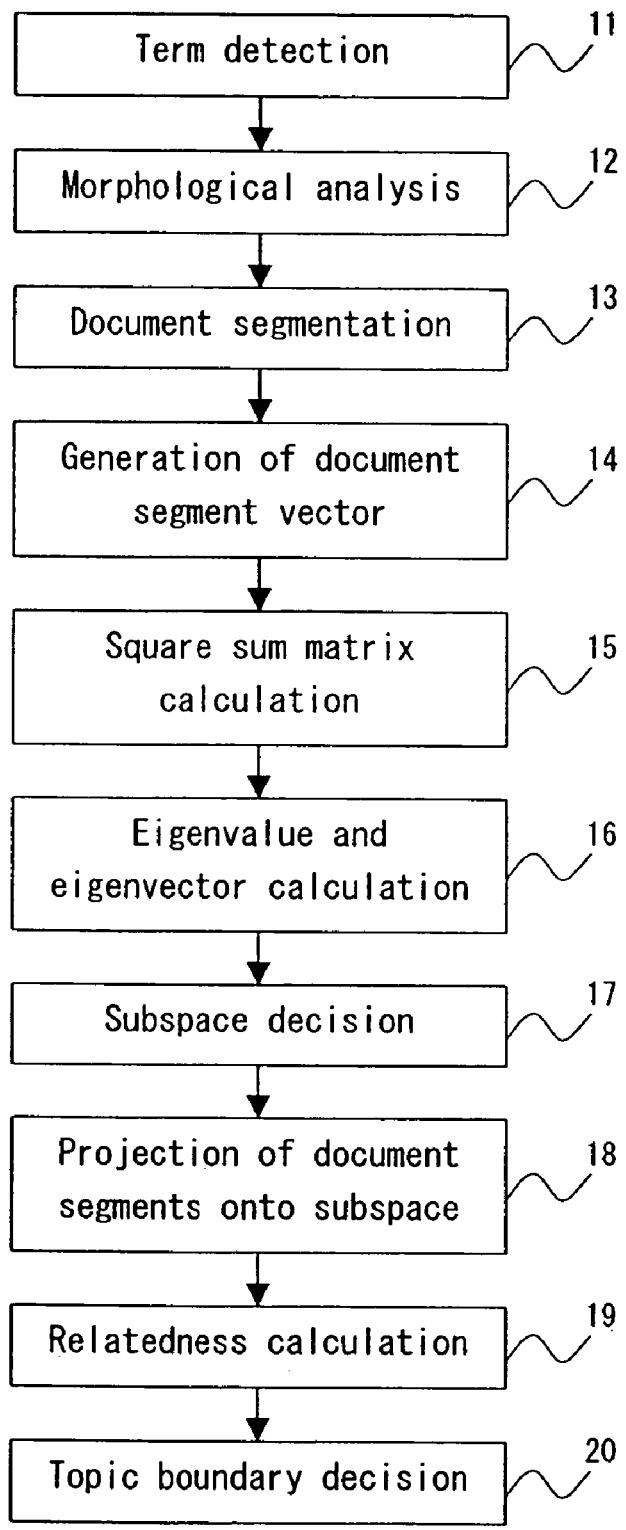
FIG. 1 is a functional block diagram for one embodiment of the invention.

FIG. 1 schematically illustrates functional blocks of one embodiment of the invention. This embodiment may be implemented using a general-purpose computer as its hardware for executing some programs incorporating inventive features.

FIG. 1 shows a term detection block 11, a morphological analysis block 12, a document segmentation block 13, a document segment vector generation block 14, a square sum matrix calculation block 15, an eigenvalue and eigenvector calculation block 16, a subspace decision block 17, a document segment vector projection block 18, a relatedness calculation block 19 and a topic boundary decision block 20. English documents are used as an example in the following description of this embodiment.

First, the term detection block 11 detects words and symbol sequences such as numerals from an input document. Words and symbol sequences are generally referred to as "terms" hereinafter. In case of English documents, it is easy to detect terms because in the English orthography terms are always written separately with blanks. The morphological analysis block 12 then performs a morphological analysis such as assigning a part of speech to each of the terms. Then, the document segmentation block 13 segments the document into document segments. The most fundamental segmentation unit for the document segmentation is a sentence. In case of English documents, it is easy to segment a document into sentences because a sentence usually ends with a period followed by at least one space. Other segmentation methods may be used; for example, several sentences may be combined to form a document segment in a manner that all segments should contain the same number of the sentences, or a document may be segmented into segments in a manner that every segment should contain the same number of terms regardless of any boundary between sentences.

The document segment vector generation block 14 calculates the number of the dimensions for vectors to be generated from the terms that occur in the entire document and determines correspondences between each dimension and each term. It should be noted that it is not necessary to assign vector elements to all kinds of terms occurring in the document. For example, using a result of the process of assigning parts of speech, it is possible to use only the terms which have been judged as a noun or a verb in the process to generate document segment vector. Then, the document segment vector generation block 14 obtains kinds of the terms occurring in each document segment and occurrence frequencies of each kind of terms, then determines values of corresponding vector elements to generate document segment vectors. Conventional methods are also employed to give a weight to each element value.

Here, assume that a document is composed of N document segments, in which k kinds of terms occur. Let $s_n=(s_{n1}, s_{n2}, \ldots, s_{nk})^T$ be the n-th document segment, where $s_{nk}$ represents the frequency value of terms $s_k$ in the n-th document segment or its weighted values, and T transpose. Then, the square sum matrix calculation block 15 calculates a square sum matrix $A=(A_{ab})$ of each document segment vector according to the following equation:

$$A_{ab} = \sum_{n=1}^{N} s_{na} s_{nb} \quad (1)$$

The eigenvalue and eigenvector calculation block 16 calculates eigenvalues and eigenvectors of the matrix A. Let $\Phi_m$ and $\lambda_m$ be the m-th eigenvector and eigenvalue of A, respectively. $\Phi_1$ represents the most common direction throughout all sentence segment vectors because the sum of the squared projections of all sentence vectors onto $\Phi_1$ is greater than that onto any other vector. Since $\lambda_1$ is the sum of the squared projections itself, it can be considered to represent the strength or energy of the concept that $\Phi_1$ represents. $\Phi_2$ is the axis that gives the largest sum of the squared projections under the constraint that $\Phi_2$ is orthogonal to $\Phi_1$. The same relationship holds for the higher order eigenvectors like $\Phi_3$ and so on. The eigenvectors obtained as described above are used as the basis vectors for a subspace approximating a set of document segment vectors. If L eigenvectors are used, the dimension number of the subspace becomes L, which means that the concept of the input document has been expanded to L eigenconcepts that are orthogonal each other.

The subspace decision block 17 then decides a value of L specifically. Given matrix A whose rank is R, the document would have R eigenconcepts since R eigenvectors can be obtained from the matrix A. The subspace represents the central concept by a combination of L eigenconcepts among R eigenconcepts (namely R-L eigenconcepts are supposed to be discarded). The basis vectors of the subspace comprises L eigenvectors. The following expression may represent how much the central concept occupies relative to the original concept. This expression can be used as a criterion for actually determining the value of L.

$$\sum_{m=1}^{L} \lambda_m \Big/ \sum_{m=1}^{R} \lambda_m \quad (2)$$

The detail of the calculation of eigenvalues and eigenvectors, and determination of a subspace are disclosed in the U.S patent application No. (docket number 40006173) titled "METHOD OF VECTOR ANALYSIS FOR A DOCUMENT", assigned to the assignee of this document, which is incorporated herein by reference.

The document segment vector projection block 18 calculates a projection value of each document segment vector onto the subspace. Let $p_n=(p_{n1}, p_{n2}, \ldots, p_{nL})^T$ be a vector of $s_n$ after the projection. The projection value $p_{nm}$ onto the m-th basis vector can be given by the following equation:

$$p_{nm} = \Phi_m^T s_n \quad (3)$$

The relatedness calculation block 19 calculates relatedness between each document segment and respective eigenconcept, or basis vector. The following is one of methods for calculating such relatedness. An average and a standard deviation of the projection values onto the m-th basis vector for all document segments can be obtained by the following equation:

$\overline{p_m}$: Average of the projection values onto the m-th basis vector for all document segments $\overline{\sigma_m}$: Standard deviation of the projection values onto the m-th basis vector for all document segments $$\overline{p_m} = \sum_{n=1}^{N} p_{nm}/N \qquad (4)$$

$$\overline{\sigma_m} = \left\{ \left( \sum_{n=1}^{N} (p_{nm} - \overline{p_m})^2 /(N-1) \right) \right\}^{1/2}$$

Let $\pi_{nm}$ be a variable indicating a positive relatedness of the n-th document segment with the m-th eigenconcept (basis vector), and let $v_{nm}$ be a variable indicating a negative relatedness of the n-th document segment with the m-th eigenconcept (basis vector). These variables can be defined as follows:

$(p_{nm} - \overline{p_m})/\sigma_m > a$ then $\pi_{nm} = 1$ else $\pi_{nm} = 0$ $(p_{nm} - \overline{p_m})/\sigma_m < b$ then $v_{nm} = 1$ \qquad (5)

else $v_{nm} = 0$

In the definition above, a and b are predetermined threshold values. Assume a function $h_m(n)$ represents the extent to which the relatedness of the n-th document segment with the m-th eigenconcept is different from the relatedness of the (n-1)th document segment with the m-th basis, that function can be defined as follows:

$$h_m(n) = \pi_{nm}(1 - \pi_{n-1m}) + v_{nm}(1 - v_{n-1m}) + (\pi_{nm} - 1) \pi_{n-1m} + (v_{nm} - 1) v_{n-1m} \qquad (6)$$

The former two terms in the equation above will take a value of 1 when the positive or negative relatedness starts from the n-th document segment and the latter two terms will take a value of 1 when the positive or negative relatedness ends at the (n-1)th document segment. In other words, the function $h_m(n)$ will take 0 when the topic related to the m-th eigenconcept continues and $h_m(n)$ will take non zero value when the topics stops or ends.

The topic boundary decision block 20 calculates h(n) for each n by following equation and obtains the maximal point of h(n):

$$h(n) = \sum_{m=1}^{L} h_m(n) \qquad (7)$$

The maximal point of h(n) is the point where the sum of the variations of the relatedness with L eigenconcepts (basis vector) becomes a maximum locally, so the head of the corresponding document segment is decided to be a topic boundary. Thus the document is segmented at topic boundaries. In the above-mentioned embodiment, although projection values of the document segment vectors onto the basis vector have been used in order to calculate the relatedness between the document segments and the eigenconcept, squared projection values can be alternatively used to obtain the same result. In this case, $p_{nm}$ is given by the following equation instead of the equation 3:

$$p_{nm} = (\phi_m^T s_n)^2 \qquad (8)$$

Figure 2:
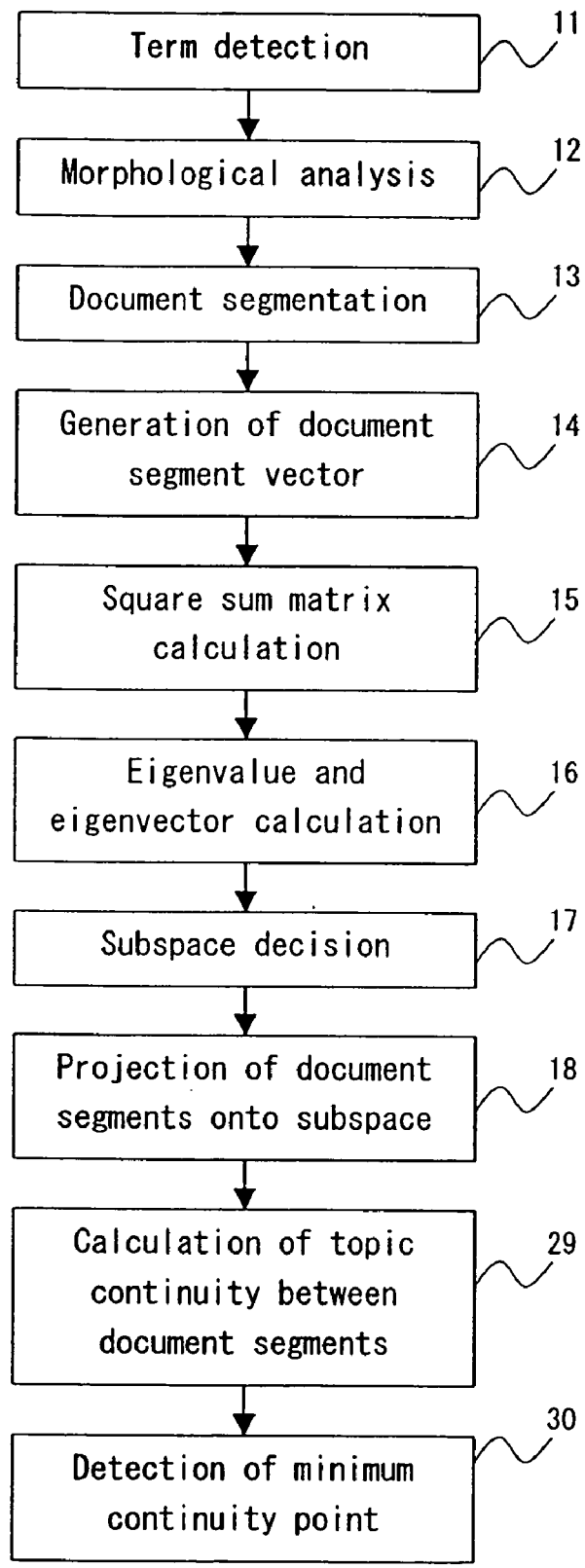
FIG. 2 is a functional block diagram for another embodiment of the invention.

FIG. 2 schematically illustrates functional blocks of another embodiment of the invention. This embodiment may be implemented by using a general-purpose computer as its hardware for executing some programs incorporating inventive features.

FIG. 2 shows a term detection block 11, a morphological analysis block 12, a document segmentation block 13, a document segment vector generation block 14, a square sum matrix calculation block 15, an eigenvalue and eigenvector calculation block 16, a subspace decision block 17, a document segment vector projection block 18, a topic continuity calculation block 29 and a minimum continuity point detection block 30. From block 11 to block 18 are same blocks as described in FIG. 1.

When the point immediately after the n-th document segment is decided as the boundary point candidate, the topic continuity calculation block 29 calculates projection vectors for all segment vectors between c document segments before the boundary point candidate and c document segments after the boundary point candidate onto the subspace to obtain the topic continuity between the document segments. Around the head or bottom of the concerned document, the number of the document segments before or after the boundary point candidate may not reach C. In this case, since all the documents existing before or after the point should be used, C represents the number of the documents existing there. Here, let $p_n = (p_{n1}, p_{n2}, \ldots, p_{nL})$ be a projection vector of the n-th document segment $s_n$ to the subspace, then the projection value $p_{nm}$ onto the m-th basis vector can be given by the above-presented equation 8. Then, the continuity h(n) is calculated using the following equations:

$$h(n) = \sum_{i=1}^{C} \sum_{j=1}^{C} \{p_{n+i}^T p_{n-j+i} / (\|p_{n+i}\| \|p_{n-j+i}\|)\} / C^2 \qquad (9)$$

$$h(n) = \{\sum_{i=1}^{C} \sum_{j=1}^{C} p_{n+i}^T p_{n-j+i}\} / \{\sum_{i=1}^{C} \|p_{n+i}\| \sum_{j=1}^{C} \|p_{n-j+i}\|\} \qquad (10)$$

$\| \|$ where represents norms, and $p_{n+i}^T p_{n-j+i}$ represents an inner product defined in the following equation:

$$p_{n+i}^T p_{n-j+i} = \sum_{m=1}^{L} p_{n+i,m} p_{n-j+i,m} \qquad (11)$$

where $P_{n+i,m}$ represents the m-th component of vector $p_{n+i}$.

Equation 9 is an average of the cosign similarity values for all combinations between the project vectors of C document segments immediately before and after the n-th document segment. In the equation 9, the similarity based on the project vectors between the shorter document segments may have too great influence on the h(n). Equation 10 is intended to decrease such influence. In both equations, the h(n) will take larger value if the topic continues before and after of the boundary point and it will take smaller value if the topic does discontinue there.

The minimum continuity point detection block 30 obtains the minimal point of h(n). The minimal point of h(n) represents the minimal point of the continuity, that is, the maximal point of the discontinuity. Accordingly, the end of the corresponding document segment can be decided to be a topic boundary. Thus the document may be segmented at the topic boundary. Although projection values of the document segment vectors onto the basis vectors have been used in order to calculate relatedness between the document segments and the eigenconcept in the above-described embodiment, squared projection values can be alternatively used to obtain the same result. In this case, $p_{nm}$ is given by the equation (8) instead of the equation (3).

Taking an actual English document as an experimental example, composed by 58 document segments (sentences), with 44 noun terms occurring at least twice in the document, it has been observed that the document segmentation result according to the invention in either FIG. 1 or FIG. 2 matches best with human perception and in particular the portions in which topic changes are confirmed by human are extracted as topic boundaries by the inventive method.

Thus, according to the invention, the precision in detecting topic boundaries is improved because the change of the concept of each sentence is obtained to detect the topic boundary.

What is claimed is:

1. A method for segmenting a given input document, comprising:
    detecting terms that occur in said input document;
    segmenting said input document into document segments, each segment being an appropriately sized chunk;
    generating document segment vectors with, as their elements, values related to frequencies of said terms occurring in said document segments;
    calculating eigenvalues and eigenvectors of a square sum matrix of said document segment vectors;
    selecting basis vectors defining a subspace from said eigenvectors;
    calculating projection vectors with, as their elements, values corresponding to projection values of the each document segment vector onto said basis vectors;
    using the projection vectors, calculating a topic continuity of the document segments; and
    determining segmentation points of said document based on the calculated topic continuity of said document segments;
    wherein when said input document, in which K terms occur, is divided into N document segments, said square sum matrix, denoted as $A_{ab}$, is calculated by a following equation:

$$A_{ab} = \sum_{n=1}^{N} s_{na} s_{nb}$$

where $s_{na}$ and $s_{nb}$ represent values corresponding to the occurrence frequencies of the a-th and b-th terms, respectively, in the n-th document segment, and the n-th document segment vector $s_n$ (n=1, ..., N) is represented by $(s_{n1}, s_{n2}, ..., s_{nk})^T$.

2. A method for segmenting a given input document, comprising:
    detecting terms that occur in said input document;
    segmenting said input document into document segments, each segment being an appropriately sized chunk;
    generating document segment vectors with, as their elements, values related to frequencies of said terms occurring in said document segments;
    calculating eigenvalues and eigenvectors of a square sum matrix of said document segment vectors;
    selecting basis vectors defining a subspace from said eigenvectors;
    calculating projection vectors with, as their elements, values corresponding to projection values of the each document segment vector onto said basis vectors;
    calculating relatedness of said document segment vectors to the respective basis vectors, using the projection vectors; and
    determining segmentation points of said document based on the relatedness of said document segment vectors to the respective basis vectors;
    wherein when $\pi_{nm}$ represents a variable indicating positive relatedness of the n-th document segment with the m-th basis vector and $\nu_{nm}$ represents a variable indicating negative relatedness of the n-th document segment with the m-th basis vector, $\pi_{nm}$ and $\nu_{nm}$ are defined using the following equation:

$(p_{nm} - \overline{p_m})/\sigma_m > a$ then $\pi_{nm} = 1$ else $\pi_{nm} = 0$ $(p_{nm} - \overline{p_m})/\sigma_m < b$ then $\nu_{nm} = 1$ else $\nu_{nm} = 0$ where a and b are predetermined threshold values, $p_{nm}$ represents a projection value or a squared projection value of the n-th document segment onto the m-th basis vector, $p_m$ represents the average of $p_{nm}$ over all of the document segments and $\sigma_m$ represents the standard deviation of $p_{nm}$ over all of the document segments.

3. The method as claimed in claim 2, wherein a function $h_m(n)$, which indicates an extent of which the relatedness of the n-th document segment with the m-th basis vector is different from the relatedness of the (n−1)th document segment with the m-th basis vector, is defined using the following equation:

$h_m(n) = \pi_{nm}(1 - \pi_{n-1m}) + \nu\nu_{nm}(1 - \nu_{n-1m}) + (\pi_{nm} - 1)\pi_{n-1m} + (\nu_{nm} - 1)\nu_{n-1m}$ the h(n) is calculated for each n by the following equation;

$$h(n) = \sum_{m=1}^{L} h_m(n)$$

and the document segmentation point is determined based on a maximal point of the calculated h(n).

4. A method for segmenting a given input document comprising:
    detecting terms that occur in said input document;
    segmenting said input document into document segments, each segment being an appropriately sized chunk;
    generating document segment vectors with, as their elements, values related to frequencies of said terms occurring in said document segments;
    calculating eigenvalues and eigenvectors of a square sum matrix of said document segment vectors;
    selecting basis vectors defining a subspace from said eigenvectors;
    calculating projection vectors with, as their elements, values corresponding to projection values of the each document segment vector onto said basis vectors;
    calculating a topic continuity of the document segments, using the projection vectors; and
    determining segmentation points of said document based on the topic continuity of said document segments;

wherein the topic continuity before and after a segmentation point candidate is calculated from all combinations of the projection vectors of a certain number of the document segment vectors immediately before said segmentation point candidate onto said subspace with the projection vectors of a certain number of the document segment vectors immediately after said segmentation point candidate onto said subspace.

5. The method as claimed in claim 4, wherein when the point immediately after the document segment n is said segmentation point candidate and the inner product between the vectors $p_{n+i}$ and $p_{n+j-1}$ is defined as the following equation:

$$p_{n+i}^T p_{n-j+i} = \sum_{m=1}^{L} p_{n+i,m} p_{n-j+l,m}$$

where L represents an order number of the subspace and $p_n = (p_{n1}, p_{n2}, \ldots, p_{nL})^T$ the projection vector of the document segment vector n onto the subspace, and the function h(n) representing the topic continuity is calculated by:

$$h(n) = \sum_{i=1}^{C} \sum_{j=1}^{C} \{ p_{n+i}^T p_{n-j+i} / (\|p_{n+i}\| \|p_{n-j+l}\|) \} / C^2$$

or $$h(n) = \{ \sum_{i=1}^{C} \sum_{j=1}^{C} p_{n+i}^T p_{n-j+i} \} / \{ \sum_{i=1}^{C} \|p_{n+i}\| \sum_{j=1}^{C} \|p_{n-j+i}\| \}$$

where C represents number of the document segments to be processed before and after said segmentation point candidate and $\| \, \|$ denotes norm.

6. The method as claimed in claim 5, wherein said document segmentation point is determined based on the minimal point of said h(n).

7. The method as claimed in claim 2, wherein when said input document, in which K terms occur, is divided into N document segments, said square sum matrix is calculated by a following equation:

$$A_{ab} = \sum_{n=1}^{N} S_{na} S_{nb}$$

where $s_{na}$ and $s_{nb}$ represent values corresponding to the occurrence frequencies of the a-th and b-th terms, respectively, in the n-th document segment, and the n-th document segment vector $s_n$ (n=1, . . . , N) is represented by $(s_{n1}, s_{n2}, \ldots, s_{nk})^T$.

8. The method as claimed in claim 4, wherein when said input document, in which K terms occur, is divided into N document segments, said square sum matrix is calculated by a following equation:

$$A_{ab} = \sum_{n=1}^{N} S_{na} S_{nb}$$

where $s_{na}$ and $s_{nb}$ represent values corresponding to the occurrence frequencies of the a-th and b-th terms, respectively, in the n-th document segment, and the n-th document segment vector $s_n$ (n=1, . . . , N) is represented by $(s_{n1}, s_{n2}, \ldots, s_{nk})^T$.

9. A computer readable medium encoded with computer-executable instructions for causing a computer to perform the method of claim 1.

10. A computer readable medium encoded with computer-executable instructions for causing a computer to perform the method of claim 2.

11. A computer readable medium encoded with computer-executable instructions for causing a computer to perform the method of claim 3.

12. A computer readable medium encoded with computer-executable instructions for causing a computer to perform the method of claim 4.

13. A computer readable medium encoded with computer-executable instructions for causing a computer to perform the method of claim 5.

14. A computer readable medium encoded with computer-executable instructions for causing a computer to perform the method of claim 6.

15. A computer readable medium encoded with computer-executable instructions for causing a computer to perform the method of claim 7.

16. A computer readable medium encoded with computer-executable instructions for causing a computer to perform the method of claim 8.

* * * * *